No. 741,272. PATENTED OCT. 13, 1903.
E. H. PORTER & B. CURRIER.
ELECTRIC INDUCTION MOTOR.
APPLICATION FILED FEB. 7, 1903.
NO MODEL. 3 SHEETS—SHEET 3.
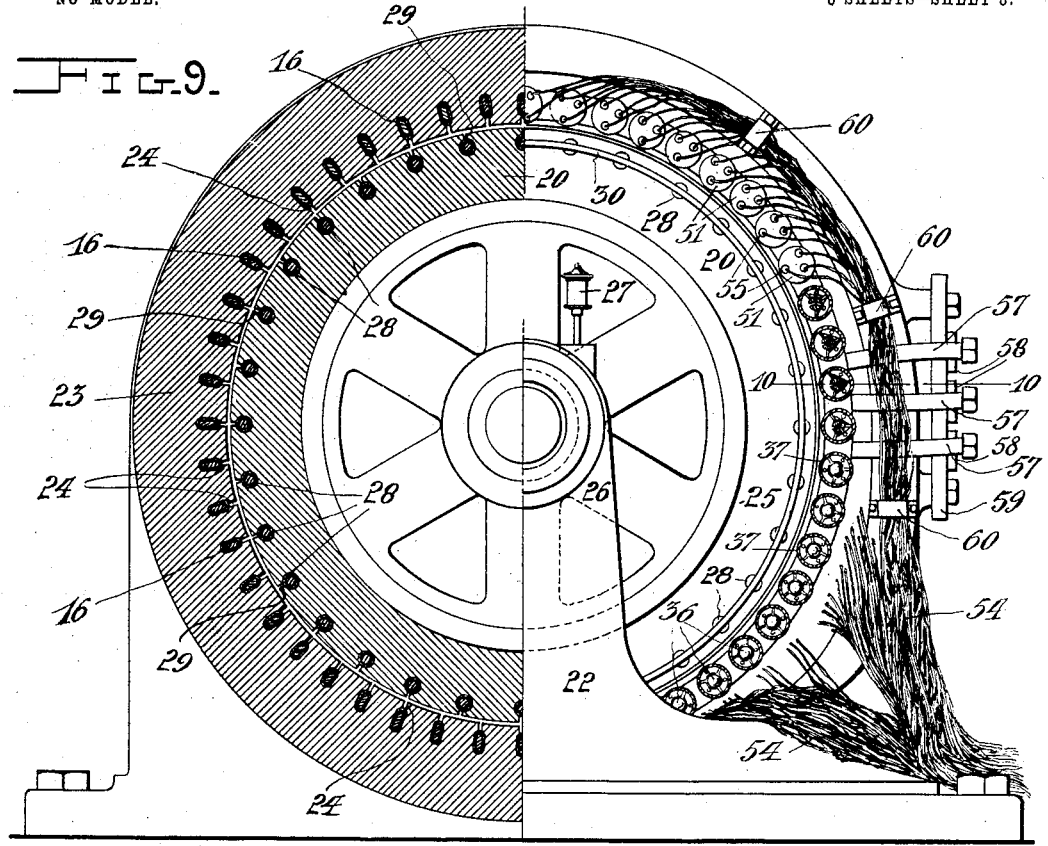
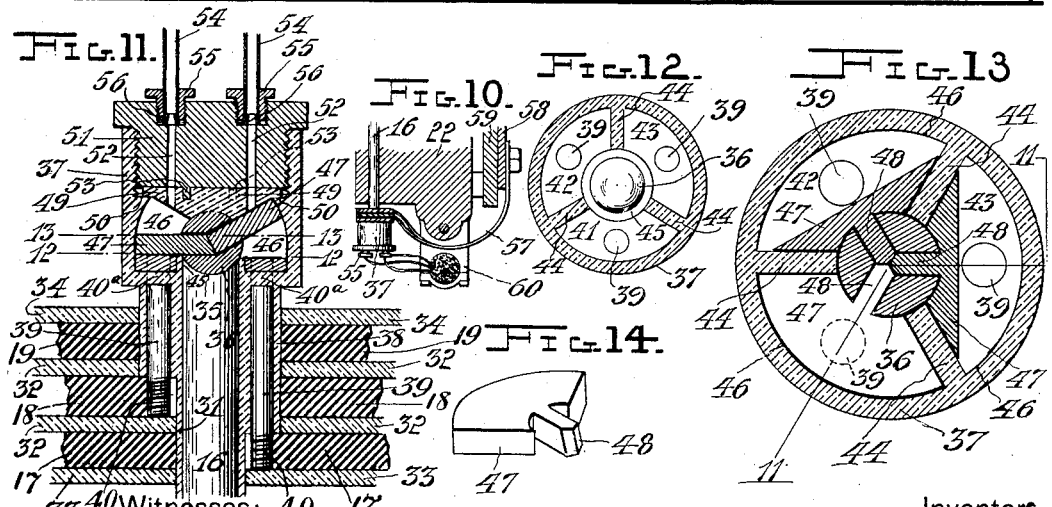
Witnesses:
Inventors
E. H. Porter
B. Currier
By Edward P. Thompson
Attorney No. 741,272.

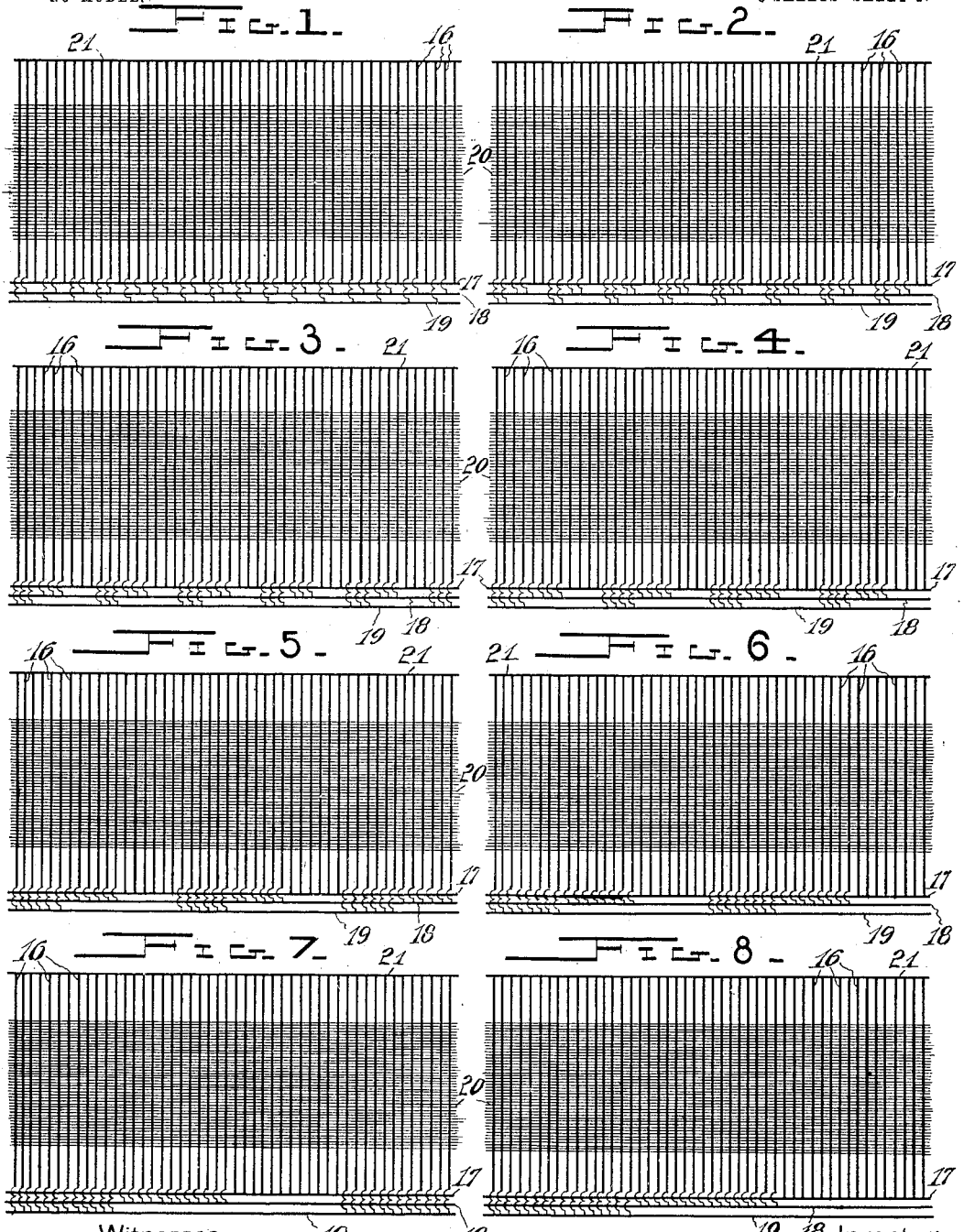

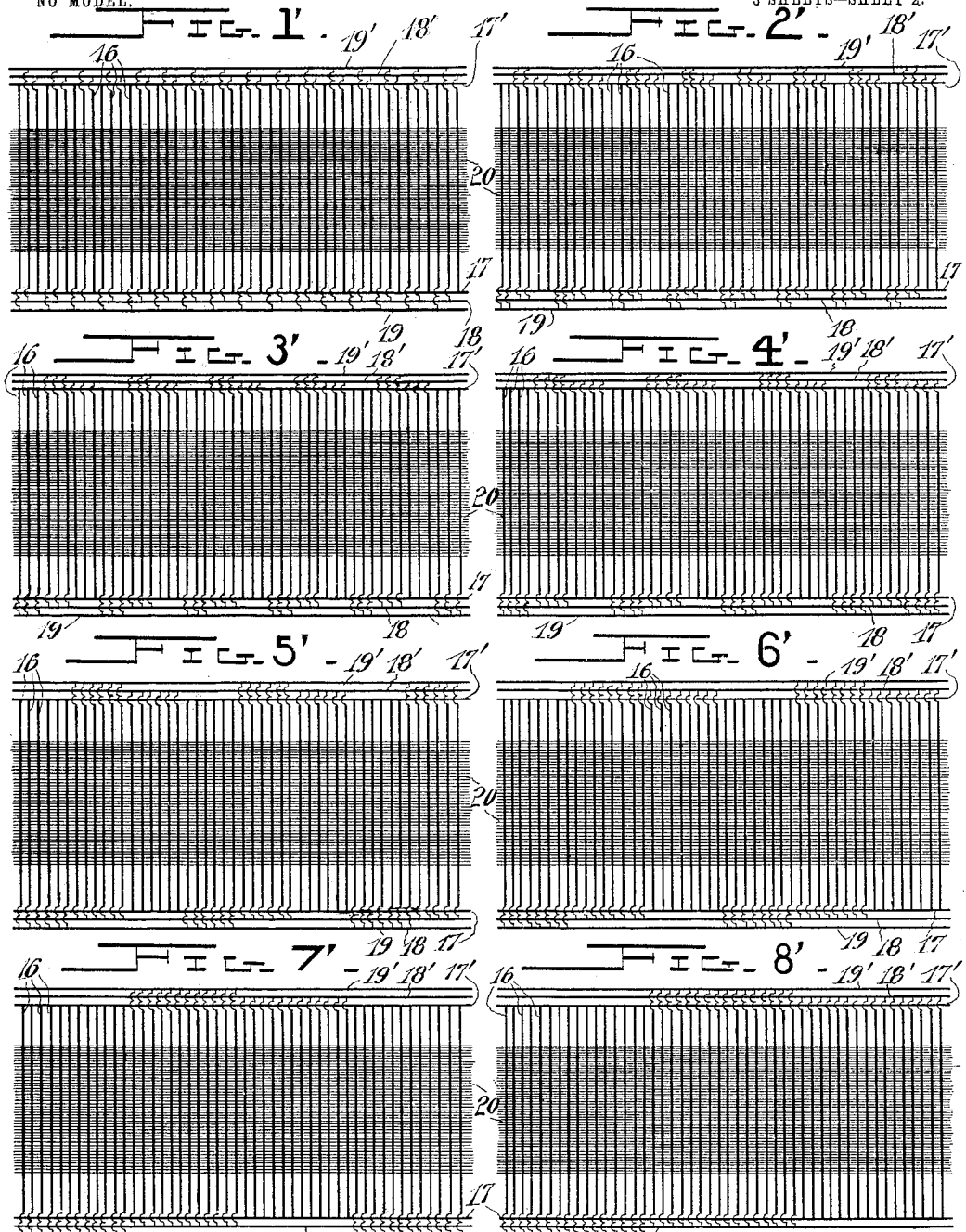

Patented October 13, 1903.

UNITED STATES PATENT OFFICE.

EDWIN H. PORTER AND BURLEIGH CURRIER, OF PHILADELPHIA, PENNSYLVANIA.

ELECTRIC INDUCTION-MOTOR.

SPECIFICATION forming part of Letters Patent No. 741,272, dated October 13, 1903.

Application filed February 7, 1903. Serial No. 142,419. (No model.)

*To all whom it may concern:*

Be it known that we, EDWIN H. PORTER and BURLEIGH CURRIER, citizens of the United States of America, and residents of Philadelphia, in the county of Philadelphia and State of Pennsylvania, have invented certain new and useful Improvements in Electric Induction-Motors, of which the following is a specification.

Our invention relates to an electric alternating-current motor which is intended, primarily, for use on electric locomotives, railroad-cars, and the like, but may also be used as a stationary motor wherever variable speed is desired.

The object of our invention is to vary the connections of the stator-bars of a motor of this type in such manner as to produce a variable speed through a wide range of variation, such as is required for a railway service.

Such motors as are in common use are ordinarily adapted for use with polyphase currents; but, as is well understood, single-phase alternating currents may also be used where starting devices are employed.

Our device for variation of speed is independent of the number of phases of the current.

As is well known, the number of revolutions per minute of an alternating-current motor of the synchronous or non-synchronous type is dependent on two factors—first, the frequency or alternations of the current, and, second, the number of poles of the motor. Now it is impracticable to vary the frequency of the circuit; but according to our invention the number of poles of the motor is varied by throwing a greater or fewer number of adjacent stator-bars in multiple with one another, according to the speed desired, and thus producing varying speeds bearing a simple relation to each other, such as one, two, three, four, six, eight, twelve, and so on.

Our invention is carried out in the manner which will be hereinafter described and which is illustrated in the accompanying drawings, wherein—

Figures 1 to 8, inclusive, are diagrammatic views showing the successive different ways in which the stator-bars of the motor are connected to the circuit of a three-phase current to produce successively-increasing speeds, the views in this figure being of a set of stator-bars developed on a plane surface, the iron laminations being indicated by longitudinal lines beneath. The connection of the circuit in this case is what is known as the "star" connection. Figs. 1' to 8' are diagrammatic views similar to Figs. 1 to 8, but showing the circuits connected by what is known as the "delta" connection. Fig. 9 is a side elevation, partly in section, of an induction-motor equipped with our improvements for varying the speed. Fig. 10 is a transverse section of one side of the motor-frame, indicating constructional details, taken on the line 10 10 of Fig. 9. Fig. 11 is a longitudinal section on the line 11 11 of Fig. 13 through the end of the stator-bars and the adjacent bus-bars and also the three-terminal switch-contact pieces and the operating means therefor. Fig. 12 is a transverse section taken on the line 12 12 of Fig. 11. Fig. 13 is a transverse section, on an enlarged scale, taken on the line 13 13 of Fig. 11; and Fig. 14 is a perspective view of one of the segmental pistons.

The same numerals of reference denote like parts in all the figures of the drawings.

In the drawings the stator-bars are indicated by the numeral 16 and the three terminals or bus-bars of a three-phase circuit by the numerals 17, 18, and 19. The rotor is designated by the numeral 20.

The motor, as shown in Figs. 1 to 8, is supposed to be connected in the well-known star fashion, one end of the different stator-bars being connected to the respective bus-bars 17, 18, and 19, and the other ends of the stator-bars may all be connected together by a ring connection 21, thus forming the well-known star method of connecting. In some cases, however, it is desirable to use the delta connection, as shown in Figs 1' to 8', in which case there is a second set of bus-bars, 17' 18' 19' at the other side of the stator instead of the ring connection 21. It will be understood that in this case a double set of switches is to be provided to be simultaneously operated at each side of the stator; but otherwise the mode of operation is identical with the star connection, which will now be described.

According to our invention we arrange the stator-bars with individual switches, by which each stator-bar may be connected to either of the three poles or bus-bars 17, 18, and 19 of the circuit, and we may arrange a controller so as to control the different groups of connections of the stator-bars nearly simultaneously, as by a movement of the controller; but such controller does not form a part of our present invention. Figs. 1 to 8 illustrate a series of different modes in which the stator-bars may be connected in a motor having one hundred and forty-four stator-bars, one-third of the armature only being shown diagrammatically.

In Fig. 1 the stator-bars are connected in groups of three to the respective bus-bars 17, 18, and 19—that is to say, there is only one bar per pole per phase—and there would be naturally forty-eight rotating poles on the stator. In Fig. 2 the bars are connected in groups of six—that is to say, two adjacent bars to the same bus-bar—the first two being connected, for instance, to the bus-bar 17, the next two to the bus-bar 18, the next two to the bus-bar 19, and so on, there being in this case two bars per pole per phase and but twenty-four rotating poles in the stator, so that the magnetic field by the connection of Fig. 2 will rotate twice as fast as that of Fig. 1, thus producing a motor of twice the speed. In Fig. 3 the bars are connected to the bus-bars in groups of nine—that is to say, there are three bars per pole per phase and but sixteen poles in the magnetic field. Hence the speed of the motor is three times that with the arrangement in Fig. 1. In Fig. 4, in like manner, the stator-bars are connected in groups of twelve, or four bars per pole per phase; in Fig. 5 in groups of eighteen, or six bars per pole per phase; in Fig. 6 in groups of twenty-four, or eight bars per pole per phase, in Fig. 7 in groups of thirty-six, or twelve bars per pole per phase, and in Fig. 8 in groups of forty-eight, or sixteen bars per pole per phase—giving, respectively, in these latter cases speeds of four, six, eight, twelve, and sixteen times the velocity of the connection of Fig. 1. Figs. 1, 2, 3, 4, 5, 6, 7, and 8 may also be taken as representing a complete developed stator containing forty-eight bars only and connected in like manner as already described.

We will now describe the method which we prefer to employ for changing stator-bar connections, although this is a matter of detail which does not form an essential part of the principle of our invention. We wish, therefore, to be understood that the following description of the construction employed by us is not essential to our invention, as we may use other modes of carrying out the same.

22 designates the frame of a motor of any preferred construction. That herein shown by us, being the one in common use, is provided with an external stator, as 23, the stator-bars 16 of which are seated in deeply-recessed slots 24 around the inner periphery of the stator and suitably insulated therefrom, as may be required. Within the circular stator is mounted the rotor 25, which is journaled in pillow-blocks, one of which is shown at 26, rising from the end of the frame. The rotor herein shown is of the squirrel-cage type, being provided with rotor-bars 28 parallel to the stator-bars at stated intervals around the circumference and embedded in deep slots 29 therein, their ends being joined by a pair of rings, one of which is shown at 30. It will be understood that rotors supplied with current from an external source may be employed, if desired, as this is indifferent so far as our invention is concerned. The ends of the stator-bars 16 are connected at the rear side of the machine (not shown in the figure) by the ring 21 when the star connection is used, while at their other ends (shown on the right-hand side of Fig. 9) they project a considerable distance, in the manner shown more clearly in Fig. 11. The three bus-bars 17, 18, and 19 are formed as three complete rings, which connect the ends of the stator-bars together, but are insulated therefrom by suitable insulating-collars 31, these bus-bars being, as shown, perforated by a series of holes, so that they pass over and surround the ends of the stator-bars 16. The three rings may be formed of bar-copper and lie one over the other, as illustrated in Fig. 11, and are separated from each other by insulating-layers 32 and from the frame of the machine by a lower insulating-layer 33, while over the top of the uppermost bar 19 may be placed a fourth ring of insulating material 34. The ends of the stator-bars 16 project beyond the insulation 34, and each is formed with a spherical concavity 35 in its end, in which is loosely journaled a metallic ball 36. The collar 31 is formed, as shown, as part of a mold or casting of insulating material, having at its outer extremity an enlarged cylindrical casing 37, and, furthermore, there are three depending tubular insulating-sheaths which pass through suitable auxiliary holes in the outermost bus-bars 18 and 19 and are designed for the insulation of connecting-conductors 39, which may be provided with suitable screw-threads 40, connecting them to their respective bus-bars 17, 18, and 19 and which, passing through the tubular appendages 38 of the casing, pass through holes in the base portion 40ª thereof and project also through holes formed in three sectoral metallic terminals 41, 42, and 43 and are electrically connected thereto. These terminals are seated in recesses each of about one hundred and twenty degrees in the base 40ª and are separated from each other by radial partition-walls 44 of the casing, which extend inwardly and abut against the ball 36. The ball 36 and the stator-bar are separated from the plates 41, 42, and 43 by insulating material 45.

The interior of the casing 37 is of spherical shape, concentric with the ball 36, and is divided into three pyramidal chambers 46, in which travel a set of three segmental pistons 47. These pistons are in close connection with the outer wall of the casing at their external periphery and at their internal periphery with the ball 36, so as to seperate hermetically the two parts of each of the chambers 46 on the respective sides of the pistons. These pistons have each an inwardly-extending radial tongue 48, which passes through and is fastened in a radial aperture in the ball 36, as shown, in such manner that only one of the pistons 47 can be in its lowermost position at the same time, as this piston, by the rolling of the ball 36, forces the other two pistons upwardly to the upper portion of their respective chambers 46. The three pistons 47 are rigid with the ball whatever the detail construction.

The upper side of the three chambers 46 of the casing 37 is closed by a washer 49, of insulating material, which fits closely against the upper side of the ball 36 and rests upon an annular shoulder 50, formed within the casing 37, and this washer 49 is held in place by a cylindrical plug 51, which is provided with suitable screw-threads, engaging with female threads formed on the inner surface of the casing 37 and which forces the washer 39 into place. Both the washer 49 and the plug 51 are pierced with a set of three tubular passage-ways 52 opposite the centers of their respective chambers 46 and which communicate with the exterior. In order to keep the passage-ways 52 formed in the washer 49 and plug 51 in line with each other, the plug 51 may be formed with a plurality of projections or snugs 53, fitting in suitable recesses in the upper face of the washer. This enables a firm joint to be formed and the parts to be held securely in place, while hermetically sealing the chambers 46 from each other and from the exterior.

The tubes 52 are arranged to be connected with a set of fluid-pressure tubes 54, which may, if desired, be of flexible metal, and are secured opposite the openings of the passage-ways 52 in any suitable manner—as, for instance, by annular plugs 55, wedged against cones 56. This is merely shown by way of example, as of course any suitable means may be used to connect the respective chambers 46 with a suitable source of hydraulic or pneumatic pressure.

It will be observed that by forcing hydraulic or pneumatic pressure through either one of the three tubes 54, connected with the chambers 46, and releasing the pressure upon the others one of the pistons 47 is forced down into connection with the terminal 41, 42, or 43, as the case may be, connecting the stator-bar with the appropriate bus-bar, while the other pistons 47 are at the same time raised up, thus preventing a short-circuit. The set of tubes 54 from all of the pressure-chambers connected with the stator-bars of the motor may be gathered together in a bundle and conveyed to a suitable controller or valve mechanism for operating the proper pistons at the proper times, and thus making the connections illustrated in Figs. 1 to 8, and 1' to 8'.

The three bus-bars 17, 18, and 19 are shown as having each a flexible ear 57, connected with one of the three poles 58 of a terminal-board 59 at the side of the motor, and the bundle of tubes 54 may be held in position by outwardly-projecting brackets 60, out of contact with the three ears 57.

While we have shown in the accompanying drawings the preferred form of our invention, it will be understood that we do not limit ourselves to the precise form shown, for many of the details may be changed in form or position without affecting the operativeness or utility of our invention, and we therefore reserve the right to make all such modifications as are included within the scope of the following claims or of mechanical equivalents to the structures set forth.

It will of course be understood that instead of individual stator-bars, each connected singly by one of the triple switches to the bus-bars, a group of several stator-bars or strands of wire or other like length of conductor may be used according to the style of construction of the motor upon which our device is used, but we have described said conductors as single bars simply because this is the most simple form of construction.

Having thus described our invention, what we claim as new, and desire to secure by Letters Patent, is—

1. In an alternating-current electric motor, the combination of a plurality of transverse conductors adapted to carry current to produce a magnetic field, an electric circuit of a plurality of phases, and means for switching the ends of said transverse conductors in multiple order with the different phases giving a variable number of bars per pole per phase.

2. In an alternating-current electric motor, the combination of a set of stator-bars in inductive relation with the rotor, an electric circuit of a plurality of phases, and means for interchangeably connecting the stator-bars with the different phases of the circuit in regular order giving a variable number of conductors per pole per phase.

3. In an alternating-current electric motor, the combination of a set of stator-bars in inductive relation with the rotor, a plurality of omnibus conductors located adjacent to the ends of the stator-bars, an electric circuit of a plurality of phases connected to the respective omnibus conductors, and a set of switches adapted to connect each of the stator-bars with any of the omnibus conductors.

4. In an alternating-current electric motor, the combination of a set of stator-bars in inductive relation with the rotor, a plurality of omnibus conductors located adjacent to the ends of the stator-bars, an electric circuit of a plurality of phases connected to the respective omnibus conductors, a set of switches adapted to connect each of the stator-bars with any of the omnibus conductors, and means for throwing any of said switches for throwing each stator-bar into connection with its appropriate omnibus conductor.

5. In an alternating-current electric motor, the combination of a set of stator-bars in inductive relation with the rotor, a plurality of omnibus conductors located adjacent to the ends of the stator-bars, an electric circuit of a plurality of phases connected to the respective omnibus conductors, a set of switches adapted to connect each of the stator-bars with its appropriate omnibus conductors, and means for throwing said switches for throwing each stator-bar into connection with its appropriate omnibus conductors and simultaneously disconnecting the bar from all of the other omnibus conductors.

6. In an alternating-current electric motor, the combination of a stator having a set of transverse conductors, an electric circuit of a plurality of phases, means for connecting one end of each of said transverse conductors to any one of said phases, and means for connecting the other end of each transverse conductor to any other phase in desired order, whereby the stator-bars are connected in "delta."

7. In an alternating-current electric motor, the combination of a stator having a set of transverse conductors, an electric circuit of a plurality of phases, means for varying the connections of the transverse conductors so as to connect them at one end in desired order with different phases giving a variable number of stator-conductors per pole per phase, and means for similarly variably connecting the other end of said conductors to the respective phases so as to give a delta connection.

8. In an alternating-current electric motor, the combination of a stator-bar, an electric circuit of a plurality of phases, an insulating-casing surrounding the ends of the stator-bar, a plurality of terminals within said casing and connected to the respective phases of the circuit, a plurality of movable contact-pieces corresponding to the respective terminals, and means for depressing one of said contact-pieces to connect electrically the stator-bar with the proper phase.

9. In an alternating-current electric motor, the combination of a stator-bar, an electric circuit of a plurality of phases, an insulating-casing surrounding the ends of the stator-bar, a plurality of terminals within said casing and connected to the respective phases of the circuit, a plurality of movable contact-pieces corresponding to the respective terminals, and means for depressing one of said contact-pieces to connect electrically the stator-bar with the proper phase, each of said contact-pieces being so connected with the others that any end of a stator-bar can only be connected with one phase at any time.

10. In an alternating-current electric motor, the combination of a stator-bar, an electric circuit of a plurality of phases, an insulating-casing surrounding the ends of the stator-bar, a plurality of terminals within said casing and connected to the respective phases of the circuit, a plurality of movable contact-pieces corresponding to the respective terminals, means for depressing one of said contact-pieces to connect electrically the stator-bar with the proper phase, each of said contact-pieces being so connected with the others that any end of a stator-bar can only be connected with one phase at any time, said means for depressing any of said contact-pieces being operable from a distance.

11. In an alternating-current electric motor, the combination of a stator-bar, an electric circuit of a plurality of phases, an insulating-casing surrounding the ends of the stator-bar, a plurality of terminals within said casing and connected to the respective phases of the circuit, a plurality of movable contact-pieces corresponding to the respective terminals, and means for depressing one of said contact-pieces to connect electrically the stator-bar with the proper phase, each of said contact-pieces being so connected with the others that any end of a stator-bar can only be connected with one phase at any time each of said contact-pieces being operated as a piston moving in a closed chamber, a tubular port connected with said chamber at one side thereof, and means for introducing pressure into said chamber to move said contact-piece.

12. In an alternating-current electric motor, the combination of a stator-bar having a projecting end and a spherical concavity therein, a metallic ball freely rotatable in said cavity, an insulating-casing surrounding the end of said stator-bar, a plurality of terminal-pieces located in the base of said casing surrounding said stator-bar and insulated therefrom, a plurality of phases connected to the respective terminals, a plurality of closed chambers formed in said casing and separated from each other by insulating-walls, a plurality of segmental pistons movable in the respective chambers and electrically connected with said ball, and means for depressing any one of said piston contact-pieces into contact with its respective terminal.

13. In an alternating-current electric motor, the combination of a stator-bar having a projecting end and a spherical concavity therein, a metallic ball freely rotatable in said cavity, an insulating-casing surrounding the end of said stator-bar, a plurality of terminal-pieces located in the base of said casing surrounding said stator-bar and insulated therefrom, a plurality of phases connected to the respective terminals, a plurality of closed chambers formed in said casing and separated from each other by insulating-walls, a plurality of segmental pistons movable in the respective chambers and electrically connected with said ball, and means for depressing any one of said piston contact-pieces into contact with its respective terminal, each of said pistons being so connected with the others that when it is depressed the other two are forced upwardly out of contact with their respective terminals.

14. In an alternating-current electric motor, the combination of a stator-bar having a projecting end and a spherical concavity therein, a metallic ball freely rotatable in said cavity, an insulating-casing surrounding the end of said stator-bar, a plurality of terminal-pieces located in the base of said casing surrounding said stator-bar and insulated therefrom, a plurality of phases connected to the respective terminals, a plurality of closed chambers formed in said casing and separated from each other by insulating-walls, a plurality of tubular passage-ways formed in said casing and connected with the respective chambers above said pistons, and means for independently introducing hydraulic or pneumatic pressure through the passage-ways into the respective chambers to depress the respective piston contact-pieces into contact with their respective terminals.

15. In an alternating-current electric motor, the combination of a stator-bar having a projecting end and a spherical concavity therein, a metallic ball freely rotatable in said cavity, an insulating-casing surrounding the end of said stator-bar, a plurality of terminal-pieces located in the base of said casing surrounding said stator-bar and insulated therefrom, a plurality of phases connected to the respective terminals, a plurality of closed chambers formed in said casing and separated from each other by insulating-walls, a plurality of tubular passage-ways formed in said casing and connected with the respective chambers above said pistons, means for independently introducing hydraulic or pneumatic pressure through the passage-ways into the respective chambers to depress the respective piston contact-pieces into contact with their respective terminals, and means for preventing more than one of said pistons from being depressed at one time, substantially as described.

In testimony whereof we have hereunto set our hands and affixed our seals this 2d day of February, 1903.

EDWIN H. PORTER. [L. S.]
BURLEIGH CURRIER. [L. S.]

Witnesses:
CHARLES E. LEX,
WM. R. STACKHOUSE.